(12) United States Patent
Culbert et al.

(10) Patent No.: US 7,504,800 B2
(45) Date of Patent: Mar. 17, 2009

(54) MANAGEMENT CIRCUITS AND METHODS FOR MANAGING A POWER SUPPLY

(75) Inventors: Michael Culbert, Monte Sereno, CA (US); Keith Cox, Campbell, CA (US)

(73) Assignee: Apple Inc., Cupertino, CA (US)

( * ) Notice: Subject to any disclaimer, the term of this patent is extended or adjusted under 35 U.S.C. 154(b) by 449 days.

(21) Appl. No.: 11/327,820

(22) Filed: Jan. 6, 2006

(65) Prior Publication Data

US 2007/0159136 A1 Jul. 12, 2007

(51) Int. Cl.
*H01M 10/44* (2006.01)
*H01M 10/46* (2006.01)

(52) U.S. Cl. ...................................................... 320/107

(58) Field of Classification Search ................. 320/107, 320/110, 141
See application file for complete search history.

(56) References Cited

U.S. PATENT DOCUMENTS 5,451,923 A * 9/1995 Seberger et al. ........ 340/310.11
6,351,172 B1 * 2/2002 Ouyang et al. ............... 327/112

* cited by examiner

*Primary Examiner*—Edward Tso
(74) *Attorney, Agent, or Firm*—IP Strategy Group, P.C.

(57) ABSTRACT

Circuitry and techniques for managing a power supply are disclosed. A processor-controlled switch is employed to control the delivery of power to conductors that provide power to an external electronic device wherein the processor controls the switch opening and the switch opening based not only on contemporaneous parameter measurements but also on state information known to the processor. The management circuit can control the power supply without requiring the use of an additional sense wire between the management circuit and the external electronic device.

31 Claims, 6 Drawing Sheets

MANAGEMENT CIRCUITS AND METHODS FOR MANAGING A POWER SUPPLY

BACKGROUND

Power supplies have long been employed to provide power to electronic devices. For example, most electronic devices require some type of power adaptor arrangement to transform household voltages (e.g., 110 V or 220 V) to the voltage level(s) suitable for charging the batteries and/or operating the electronic components.

As power adaptor design evolves, the design has become more user-friendly over time. Most power adaptors nowadays enclose the power electronics and/or electrical circuitry in a power adaptor housing. The power electronics and/or electrical circuitry within the power adaptor housing performs the voltage/current transformation tasks to provide the suitable voltage levels for device operation. These voltages/currents are then provided to the electronic device (e.g., a laptop computer or a digital audio/video player) via flexible electrical conductors. The flexible electrical conductors are coupled to pins of a connector plug that is configured to be mated with a corresponding socket in the electronic device.

This arrangement substantially minimizes the impact on the portability of the electronic device while power is plugged in. For example, a laptop user may continue to move the laptop computer around while being plugged in with relative ease since the laptop is connected to a flexible conductor cable and the bulk of the power electronics of the power adaptor is advantageously disposed further away from the laptop (e.g., on the floor).

Power adaptors have also evolved to the point where management circuitry is provided to monitor the operation of the power electronics and to respond if changing, dangerous and/or undesirable operating conditions exist. For example, the management circuitry of some power adaptors may allow the adaptor to cease providing power to the electronic device if the power adaptor overheats, for example.

As users demand more and more sophistication from their electronic devices and accessories, management circuitries and techniques for power supplies continue to improve. This patent application relates to novel and innovative arrangements and techniques for managing power supplies.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

The invention relates, in an embodiment, to a management circuit (MC) for a power supply, the power supply being configured to supply a first voltage level and a ground voltage level. The management circuit includes a first MC terminal coupled to a positive supply terminal of the power supply, the positive supply terminal being configured to provide the first voltage level. The management circuit further includes a second MC terminal coupled to a ground terminal of the power supply, the ground terminal being configured to provide the ground voltage level. The management circuit additionally includes a switch and a processor coupled to the switch for controlling the switch. The management circuit also includes a first output terminal, the switch being coupled to the first MC terminal and the first output terminal for controllably providing the first voltage level to the first output terminal. There are also included a first impedance circuit coupled to the second MC terminal and a second output terminal coupled to the first impedance circuit, wherein the processor controls the switch opening and the switch closing responsive to both parameters sensed through the first output terminal and the second output terminal and previous state information pertaining to a present operating state of the management circuit.

In another embodiment, the invention relates to a method for controlling a power supply, the power supply being configured to supply a first voltage level and a ground voltage level. There is included providing a management circuit having a processor coupled to a switch, the switch being coupled between a first output terminal of the management circuit and a positive supply terminal of the power supply that provides the first voltage level. The processor controls switch opening and switch closing of the switch to respectively break and make a conduction path between the first output terminal and the positive supply terminal. The method also includes providing a impedance circuit coupled between a ground terminal of the power supply that supplies the ground voltage level and a second output terminal of the management circuit, whereby the first output terminal and the second output terminal representing respectively a power conductor and a ground conductor configured to provide the first voltage level and the ground voltage level respectively to an electronic device when the electronic device is coupled to the management circuit. The method additionally includes monitoring voltages obtained at at least one of the first analog sense node and the second analog sense node using the processor, wherein the voltages at the first sense node and the second sense nodes are derived from one of voltage and current obtained from the first output terminal and the second output terminal, the processor controlling the switch opening and the switch opening based at least on the voltages obtained at the at the at least one of the first analog sense node and the second analog sense node and previous state information pertaining to a present operating state of the management circuit.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1:
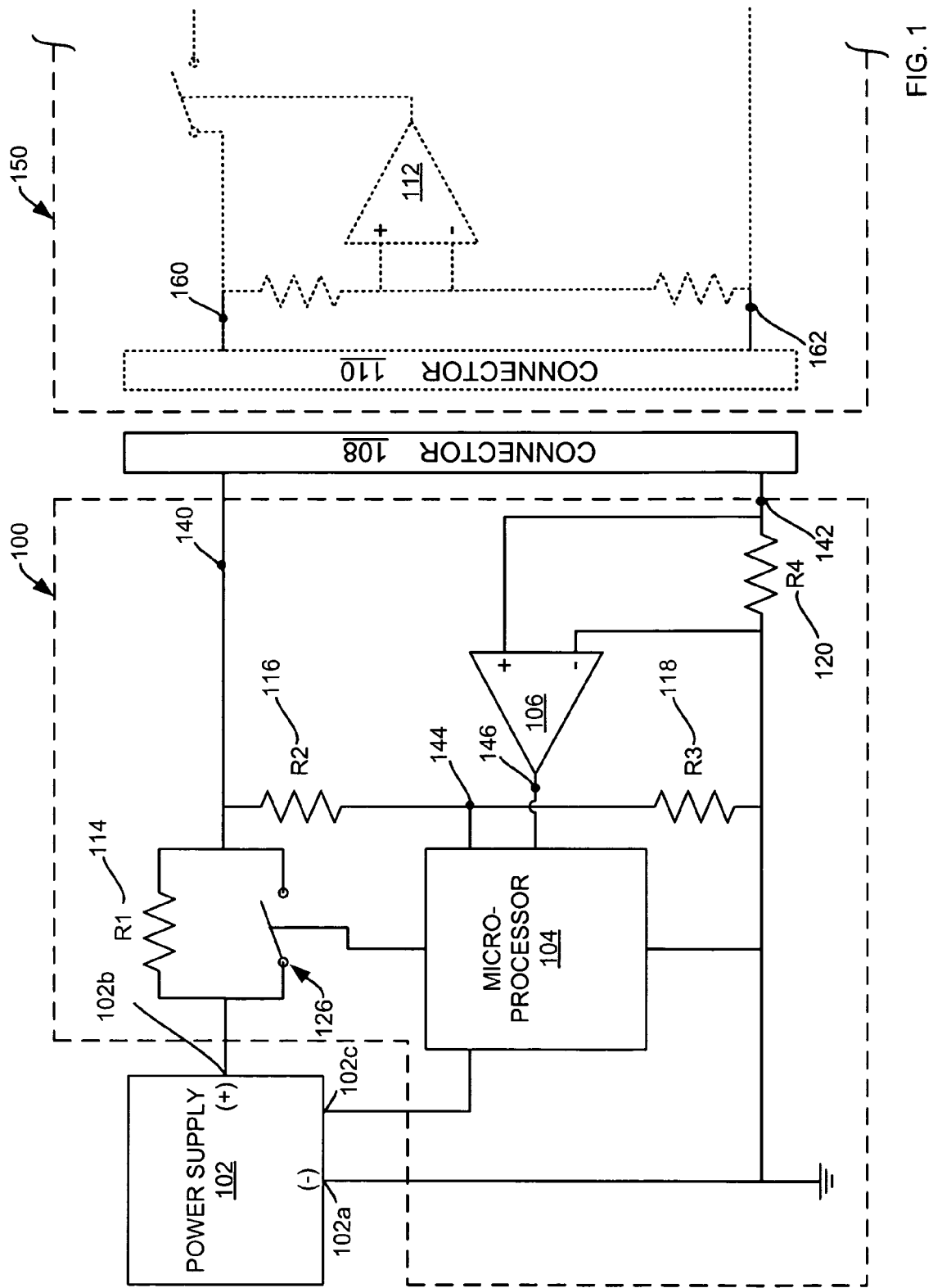
FIG. 1 shows a schematic diagram of a power supply and a power management circuit, in accordance with an embodiment of the present invention.

FIG. 1 is a schematic representation of a power protection circuit (PPC) 100 in accordance with an embodiment of the present invention. FIG. 1 shows a power supply (PS) 102, representing a direct current power source having a negative terminal 102$a$ and a positive terminal 102$b$, and a shut-down terminal 102$c$. Power supply terminals 102$b$ and 102$a$ supply power and ground respectively to operate PPC 100 and an electronic device 150 if the electronic device is coupled to PPC 100. Shut-down terminal 102$c$ is configured to receive a shut-down signal from a processor 104 of PPC 100 to shut down power supply 102 in case there is a fault condition, for example.

Power supply 102 may represent, for example, a power adapter that transforms household voltages (e.g., 110 V or 220 V) to voltage and current levels suitable for operating PPC 100 and electronic device 150 in accordance with user specification. In the example of FIG. 1, electronic device 150 represents a laptop computer although electronic device 150 may represent any power consuming electronic device, whether or not equipped with a battery.

Positive supply terminal 102$b$ is shown coupled to a processor-controlled switch 126, which opens and closes responsive to a control signal from processor 104 to respectively break and make electrical contact with a node 140. Node 140 is coupled to a pin (not shown) in a connector 108 to transmit power to a node 160 of electronic device 150 when power supply 102 is turned on, switch 126 is closed, and electronic device 150 is coupled to PPC 100. A node 142 at the bottom of FIG. 1 provides a grounding path for circuitry within electronic device 150 when connector 108 of PPC 100 and connector 110 of electronic device 150 are coupled together. Nodes 140 and 142 represent, for example, the wired conductors that are employed to carry power and ground from the circuitry bulk of the power adapter to the plug that is mated with the laptop computer. The components of PPC 100 may be integrated within the power adapter housing that also houses power supply 102, in an embodiment.

In parallel with switch 126 is an impedance circuit 114, represented in the example of FIG. 1 by a resistor R1. As will be discussed later herein, impedance circuit 114 along with impedance circuit 116 (represented by a resistor R2 in the example of FIG. 1), impedance circuit 118 (represented by a resistor R3 in the example of FIG. 1), and impedance circuit 120 (represented by a resistor R4 in the example of FIG. 1) operate cooperatively with power supply 102, switch 126, and a differential amplifier 106 to provide sensing voltage levels to analog input nodes 144 and 146 of processor 104. These voltage levels enable processor 104 to ascertain the operating conditions of power supply 102 and electronic device 150. These operating conditions in turn enable processor 104 to appropriately operate switch 126 and/or power supply 102 to deliver or cut off power to node 140.

The operation of PPC 100 may be better understood with reference to a few simple example scenarios below. For even more detailed information, discussions of various example scenarios are also discussed in connection with the flowcharts provided with other figures herein.

The first scenario represents the default situation wherein connector 108 is unconnected, i.e., not coupled to electronic device 150 or any other device. In this case, PPC 100 is said to be in the "unconnected" state, and it is desirable to turn off power to pin 140 to prevent an accidental shorting of the pins of connector 108 from creating sparks and/or damage PPC 100 and/or damage power supply 102.

In the default scenario (which also represents a typical starting condition for PPC 100), switch 126 is open, thereby effectively interrupting the low-impedance path from positive supply terminal 102$b$ to node 140. Since connector 108 is also disconnected from connector 110 of electronic device 150, no current flows through resistor R4, thereby resulting in no voltage difference across resistor R4. Differential amplifier 106 (which may represent a stand-alone component or may be integrated with other components such as within processor 104) senses the current flowing through resistor R4 (as reflected by the potential difference across R4) and provides an analog input to processor 104 via sense node 146. In this case, the analog input at sense node 146 will be essentially zero to reflect the fact that no current flows through resistor R4.

The voltage at sense node 144 is determined by the voltage dividing circuit comprising resistors R1, R2, and R3 and reflects a value characteristic of the unplugged state. As long as the voltage at sense node 144 stays within the value range characteristic of the unplugged state (referred to herein as the "unplugged voltage range"), processor 104 keeps switch 126 open.

The second scenario relates to the situation wherein connector 108 of PPC 100 was previously unconnected but is now connected to connector 110 of electronic device 150. Further, assume that both PPC 100 and electronic device 150 operate normally (i.e., there are no fault conditions in either PPC 100 or electronic device 150). In this case, it is desirable to deliver power from power supply 102 to electronic device 150 after it is ascertained that the coupling between connector 108 and electronic device 150 is satisfactory.

Starting from the default unplugged state discussed above, the coupling of connector 108 to electronic device 150 changes the impedance seen by nodes 140 and 142. Even though switch 126 remains open at this point in time, the voltage value at sense node 144 changes due to the fact that an impedance load characteristic of electronic device 150 has now been placed in parallel with resistors R2-R3. The voltage value at sense node 144 will be in the range (referred to herein as the "good connection voltage range") that reflects the fact that an impedance load characteristic of electronic device has been coupled to nodes 140 and 142.

This voltage value in the "good connection voltage range" is detected by processor 104 (which reads the voltage value at sense node 144) and results in the processor recognizing that PPC 100 is now coupled with electronic device 150. This recognition causes processor 104 to close switch 126 to cause power to be delivered to node 140 from power supply terminal 102b. For robustness, processor 104 may require that the voltage at sense node 144 stays within the "good connection voltage range" for a given amount of time before switch 126 is closed. This time delay eliminates the possibility that transient voltages at sense node 144 may inadvertently cause processor 104 to close switch 126. Note that if the voltage at sense node 144 is outside of this characteristic range, the processor would not recognize that PPC 100 is now coupled with electronic device 150 and would not cause switch 126 to be closed.

PPC 100 is now in the connected state, and the voltage at sense node 146 and/or sense node 144 are monitored for other scenarios. Note that in this connected state, the current through R4 will be higher than in the unplugged state, causing differential amplifier 106 to sense the larger voltage difference across R4. As will be discussed later herein, the sensed voltage difference across R4 is employed to ascertain the transition to other operating states from the connected state.

The next example relates to the situation wherein the voltage difference across resistor R4 drops. This voltage difference across R4 may drop due to diminished current through resistor R4, which in turn may be due to, for example, either the "low power" scenario or the "decoupling" scenario.

In the "low-power" scenario, the user may have turned off the laptop computer while leaving the power adapter plugged in. In this case, the user may for example wish to continue to trickle charge the battery of the laptop as needed to prevent a "brown-out" condition. As another example, certain electronic device continues to have a portion of their circuitry operating in the low-power mode (e.g., sleep or hibernate or watch-dog circuitry). In these cases, the appropriate action is to continue supplying power to node 140 even though processor 104 may have sensed at sense node 146 that the current through R4 has dropped.

Alternatively, in the "decoupling" scenario, the user unplugs connector 108 from connector 110. In this case, it is desirable to interrupt power delivery to node 140 from positive supply terminal 102b by opening switch 126.

In an embodiment, both the low-power scenario and the decoupling scenario are first detected when the current through resistor R4 drops below a certain "connection" threshold. In other words, as soon as the voltage at sense node 146 drops below the "connection" threshold (typically some small voltage level above zero), processor 104 deems that the connected state is terminated and PPC 100 may be transitioning to either the low-power scenario or the decoupling scenario.

The low-power scenario is ascertained and handled as follows. Upon detecting that the current through resistor R4 has dropped below the "connection" threshold (as evidenced by the voltage across R4, which is sensed by processor 104 via differential amplifier 106), processor 104 commands switch 126 to open to interrupt the flow of current from positive supply terminal 102b into node 140. The opening of switch 126 causes the voltage at node 140 to drop from the high voltage level that existed when switch 126 was closed. The decay of the voltage level at node 140 also causes the voltage level at sense node 144 to decay. The decay at sense node is then monitored by processor 144. In an embodiment, the level or rate of decay or pattern of decay may be monitored. Generally speaking, processor 144 has internal memory or access to memory to stores in advance information such as expected voltage levels of various states/scenarios, expected decay rate, expected plot of voltage and/or current versus time, voltage thresholds, timer duration, etc.

If the voltage at sense node 144 is characteristic of a PPC that transitions from a connected state to a low-power state (e.g., in the case where the user turns off the laptop computer but leaves the laptop computer connected to PPC 100, thereby reducing the current draw but leaving the system impedance of electronic device 150 connected across nodes 140 and 142), processor 104 turns on switch 126 to allow power delivery to resume to node 140. This permits, as mentioned earlier, power to be delivered to the laptop computer to, for example, prevent a "brown-out condition" or keep some small watch-dog circuits active. In an embodiment, a small delay may be built-in (via a timer, for example) between the cycles of sensing the drop at sense node 144 and turning on switch 126 so that switch 126 is not needlessly cycled on and off rapidly. For example, a delay may be provided such that the maximum off-and-on switch rate of switch 126 is about 3 times a second during the "low-power" state.

If, however, the voltage at sense node 144 is characteristic of a PPC that transitions from a connected state to a disconnected state (e.g., in the case where the user unplugs the laptop computer from the PPC 100, thereby removing the system impedance of electronic device 150 from nodes 140 and 142), processor 104 keeps switch 126 off after the voltage at sense node 144 stays above the "connection" threshold after a period of time. This is a desirable result to keep power from being delivered to the pins of an unplugged power adapter.

Another scenario relates to the case wherein the pins of connector 108 are shorted when switch 126 is off. As expected, this should not cause any damage since no appreciable amount of power is delivered to node 140 when switch 126 is turned off. However, since there is current flowing through the R1-R2-R3 loop, as well as through the R1-shorted pins-R4 loop, an analysis is provided for completeness. Resistor R4 is typically much smaller than resistor R1. For example, resistor R4 may be in the range of milli-ohms such as 10 milli-ohms in an embodiment. As a further example, resistor R1 may be in the range of kilo-ohms, such as about 150 kilo-ohms in an embodiment. In this case, most of the voltage drop in the R1-shorted pins-R4 loop will be across resistor R1 when the pins of connector 108 are shorted, causing the voltage level at node 140 to drop to nearly zero.

This near-zero voltage at node 140 is reflected at sense node 144 due to the voltage divider circuit of loop R1-R2-R3 and sensed by processor 104. Since the low voltage at sense node 144 is lower than the aforementioned "good connection voltage range," processor 104 does not turn on switch 126. In fact, even if transient conditions during the shorting process causes the voltage at node 144 to happen to be in the aforementioned "good connection voltage range," it is highly unlikely that this transient condition would stay stable long enough to satisfy the stable time requirement imposed by the delay clock. If the voltage at sense node 144 does not stay in the aforementioned "good connection voltage range" for the requisite time period imposed by the delay clock, processor 104 does not turn on switch 126.

Another scenario relates to the case wherein connector 108 is plugged into an electronic device but a short occurs after switch 126 is closed. In other words, the short is experienced after power is delivered to node 140 (and to any connected electronic device). In this case, it is desirable to immediately turn off switch 126 (and optionally to immediately turn off power supply 102) to prevent further damage.

After connector 108 is plugged into the electronic device and switch 126 is closed, the voltage drop across resistor R4 is watched by processor 104 via differential amplifier 106 as mentioned. If the current through resistor R4 exceeds a first "dangerous" threshold level for a certain time period (which high current condition is reflected in the large voltage difference across R4 and sensed by processor 104 via amplifier 106 and node 146), processor 104 opens switch 126 and turns off power supply 102 (by issuing a command via terminal 102c).

In an embodiment, a second, "critical" threshold that is higher than the "dangerous" threshold may be established. If the current through resistor R4 exceeds the critical threshold level (which critical current condition is reflected in the larger voltage difference across R4 and sensed by processor 104 via amplifier 106 and node 146), processor 104 immediately opens switch 126 and immediately turns off power supply 102 (by issuing a command via terminal 102c) substantially without any delay.

In this manner, a persistent and dangerous high current fault condition will cause switch 126 to be opened and power supply 102 to be turned off after some time. A critical high current fault condition will cause switch 126 to be immediately opened and power supply 102 to be immediately turned off.

Alternatively or additionally, the voltage at sense node 144 may also be monitored. In an embodiment, if the voltage at sense node 144 stays below a first shut-off voltage threshold for a given period of time, processor 104 opens switch 126 and turns off power supply 102 (by issuing a command via terminal 102c). In an embodiment, if the voltage at sense node 144 falls below a second shut-off voltage threshold that is lower than the first shut-off voltage threshold, processor 104 immediately opens switch 126 and immediately turns off power supply 102 (by issuing a command via terminal 102c) substantially without any delay.

Figure 2:
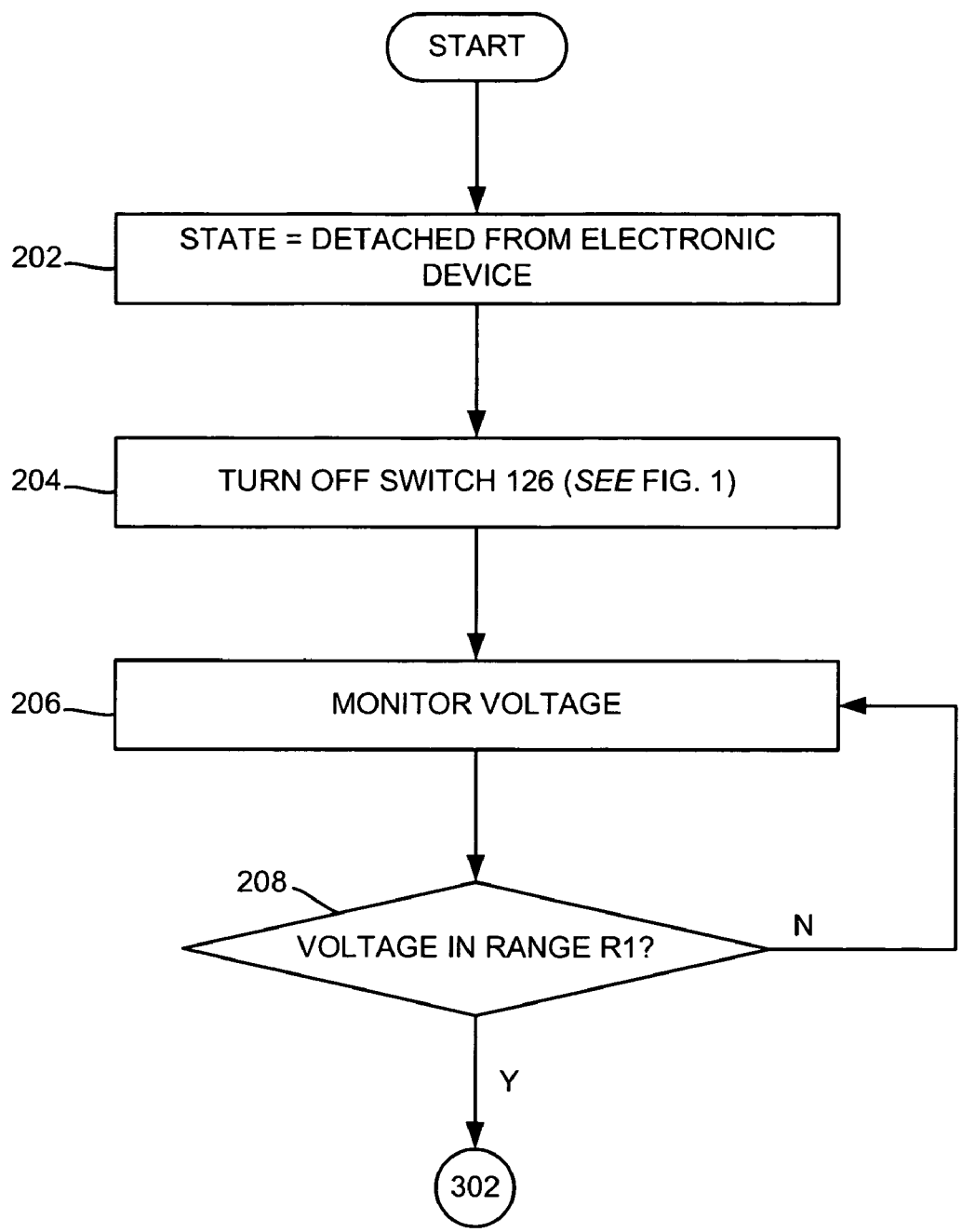
FIG. 2 shows a flow chart describing the steps/actions taken in the disconnected state, in accordance with an embodiment of the present invention.

FIG. 2 is an illustrative flowchart of a method of monitoring a power circuit in accordance with an embodiment of the present invention. At a first step 202, the method assumes that the PPC is disconnected from an electronic device. At a next step 204, switch 126 (see FIG. 1) is turned off or opened. As noted above, when switch 126 is opened and PPC 100 is unconnected to the electronic device, no power is delivered to node 140. However, current still flows through the R1-R2-R3 loop, allowing processor 104 to monitor the voltage level at sense node 144 (step 206). In some embodiments, the frequency of monitoring occurs at approximately 1,000 hertz although other suitable monitoring frequencies are also possible.

If, as shown in step 208, the voltage at sense node 144 enters into the range R1 (e.g., the aforementioned "good connection voltage range"), the method proceeds to step 302 wherein operating parameters/conditions of the PPC are tested to determine the appropriate action(s) to be taken next. On the other hand, if the voltage at sense node 144 stays outside of this range, the PPC remains in the disconnected state, and the method returns from step 208 to step 206 to continue to monitor the voltage at sense node 144.

Figure 3:
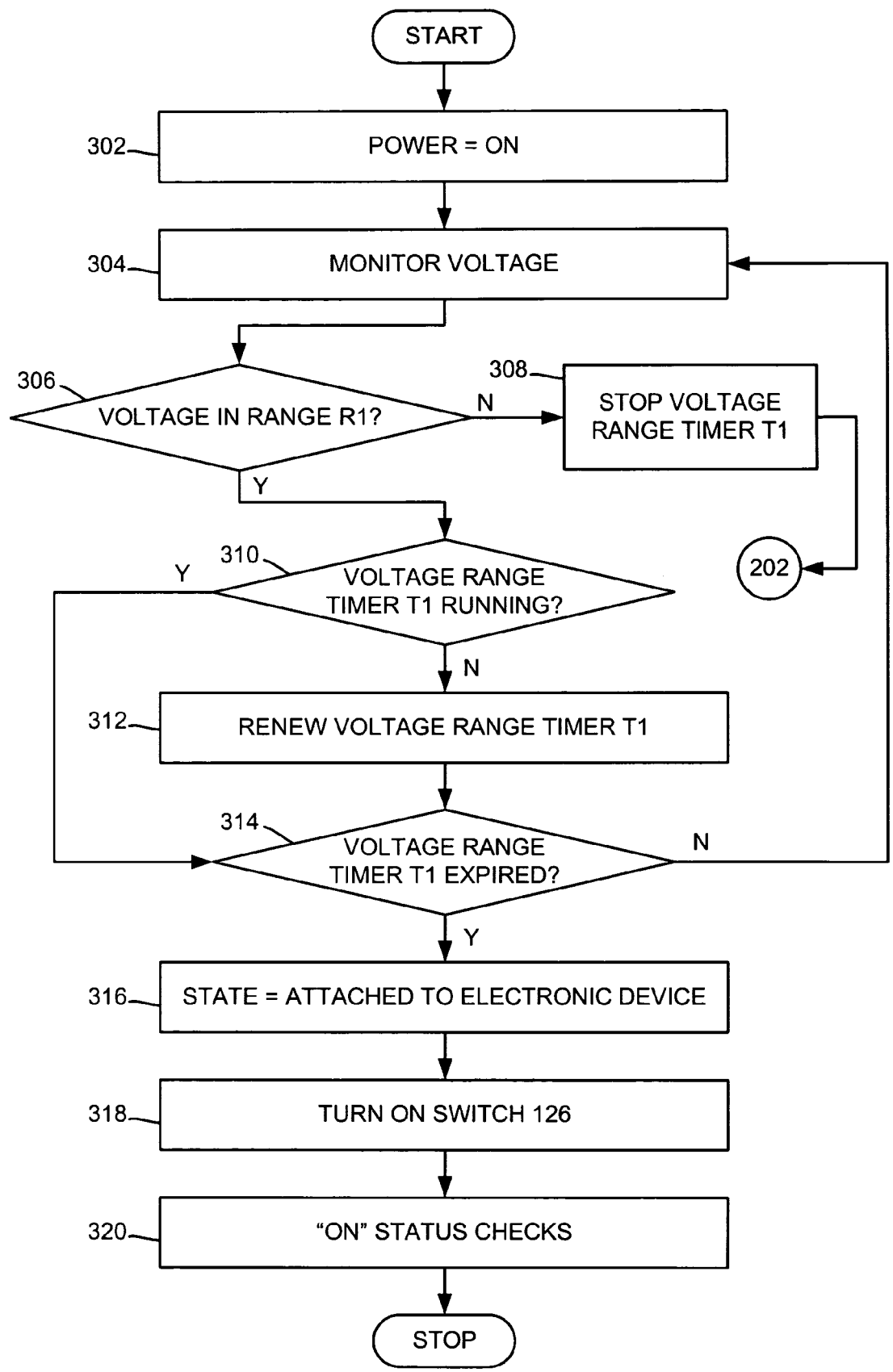
FIG. 3 shows a flow chart describing the steps/actions taken in transitioning from the disconnected state to the connected state, in accordance with an embodiment of the present invention.

FIG. 3 is an illustrative flowchart of a method of protecting a power circuit when the PPC transitions out of the disconnected state, in accordance with an embodiment of the present invention. Generally speaking, after the voltage at sense node 144 enters the voltage range R1 (e.g., the aforementioned "good connection voltage range"), the steps of FIG. 3 ascertain whether the voltage at sense node 144 stays stable within the range for a predefined time period (determined by a timer T1) or is a transient condition. If the voltage at sense node 144 stays stable within the voltage range R1 for a predefined time period (determined by a timer T1), switch 126 is turned on to deliver power to node 140. On the other hand, if the voltage at sense node 144 does not stay stable within the range R1 for a predefined time period, transients are deemed to be the cause for the fluctuation of the voltage level at sense node 144, and the PPC transitions back to the disconnected state of FIG. 2 without turning on switch 126.

Thus, at step 302, the power supply 102 is shown to be on but switch 126 remains off. Step 302 is arrived at from step 208 of FIG. 2 when the voltage at sense node 144 enters the voltage range R1 (e.g., the aforementioned "good connection voltage range"). In this case, the voltage at sense node 144 is continued to be monitored (step 304). If the voltage at sense node 144 stays in the voltage range R1, the method checks to see if the stable period requirement has been satisfied (steps 310, 312, and 314). Thus, in step 310 and 312, the timer is started if a timer has not been started. After the timer is started (step 312) or if the timer has already started (yes branch of step 310), the method checks at step 314 to determine whether the timer has expired.

If the timer has expired while the voltage at sense node 144 stays within the voltage range R1 (yes branch of step 314), the operating state of the PPC is deemed to be the connected state (316), and switch 126 is then turned on (318). Thereafter, the method monitors the voltage at one or both of sense nodes 144 and 146 to monitor the operating status. This monitoring will be discussed later herein.

On the other hand, if the timer has not expired while the voltage at sense node 144 stays within the voltage range R1 (no branch of step 314), the method returns from step 314 to step 304 to continue to monitor the voltage at sense node 144.

Note that if the voltage at sense node 144 drops outside of the voltage range R1 before the timer expires, the timer is stopped and reset (no branch of step 306 and step 308), and the method returns to the disconnected state of step 202 of FIG. 2.

Figure 4:
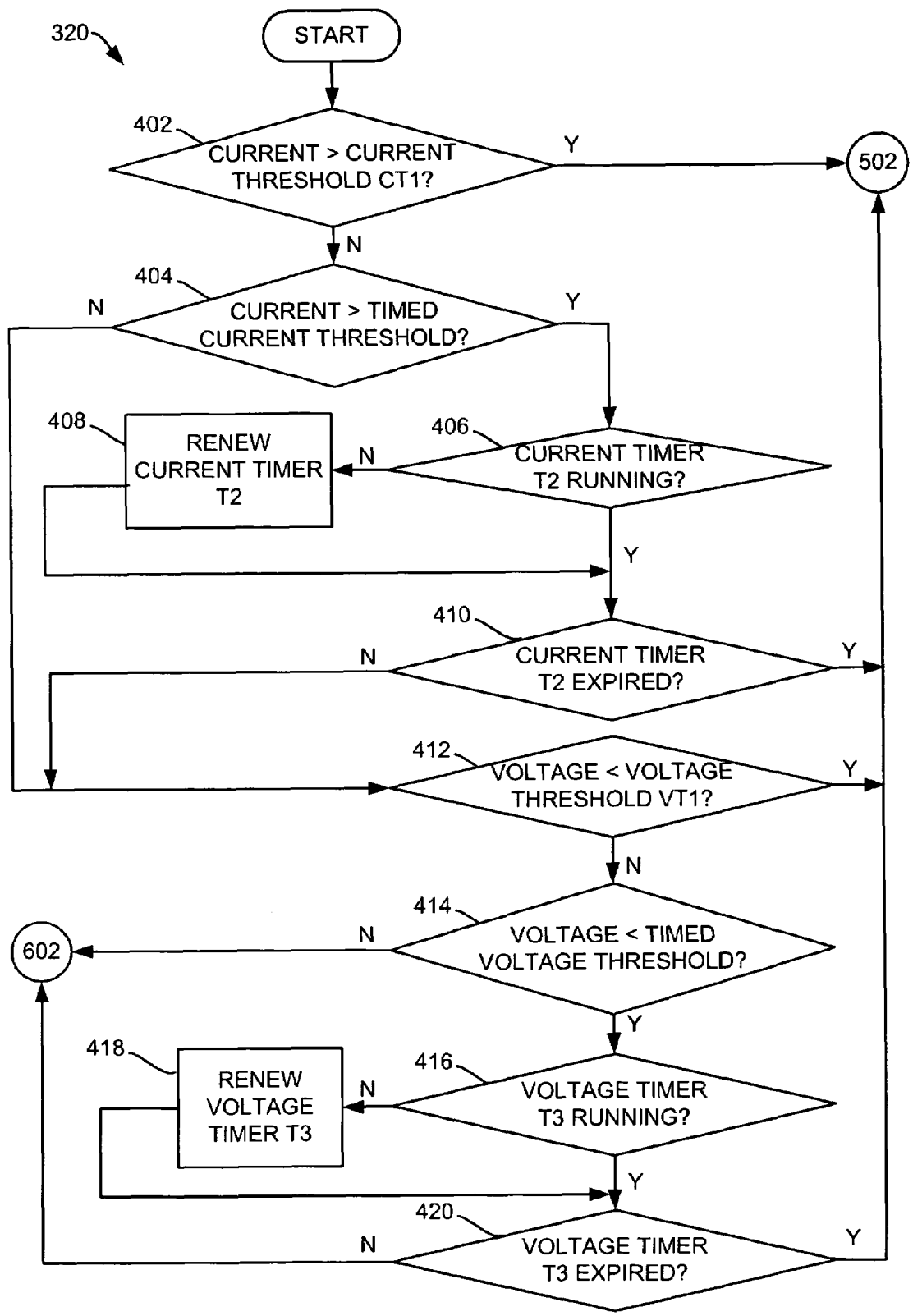
FIG. 4 shows a flow chart describing the steps/actions taken while performing "on" status checks, in accordance with an embodiment of the present invention.

FIG. 4 is an illustrative flowchart of the "ON" status checks (step 320), in accordance with an embodiment of the present invention. Generally speaking, steps 402, 404, 406, 408, and 410 ascertain whether a dangerous or critical current condition has occurred while the PPC is in the connected state and switch 126 is closed. Steps 414, 416, 418, and 420 check to see whether a low voltage condition seen across resistor R4 represents a dangerous/critical situation, the "low power" scenario (e.g., the user turns off the laptop computer but leaves the power adapter plugged in) or the "decoupling" scenario (e.g., the user disconnects the laptop computer from the power adapter).

At step 402, the current through resistor R4 is checked (by processor 104 via node 146 and differential amplifier 106) to see whether that current exceeds a critical threshold CT1. If the current through resistor R4 exceeds this critical threshold CT1, the method proceeds to step 502 of FIG. 5 to immediately turn off all timers (step 502 of FIG. 5) and to turn off the power supply 102 (step 504 of FIG. 5). Alternatively or additionally, the processor may also open switch 126. Thereafter, the method returns from step 504 of FIG. 5 to step 202 of FIG. 2 (representing the disconnected state).

At step 404 (from the no branch of step 402), it is ascertained whether the current through resistor R4 exceeds a lesser but potentially dangerous threshold. If not (no branch step 404), the method proceeds to step 412 to begin checking to see whether a low voltage condition exists at sense node 144. As mentioned, the low voltage condition at sense node 144 may exist due to, for example, a short that occurs when power is being delivered. Note that this check (steps 412, 414, 416, 418, and 420) is shown in series with the high current check of steps 402-412. In practice, these two checks may be made in parallel if desired.

Returning to step 404, if on the other hand the current through resistor R4 exceeds a lesser but potentially dangerous threshold, the method proceeds to one or more of steps 406, 408, 410, and 412 to check whether the dangerous but non-critical current condition persists longer than a predefined time (as measured by timer T2). Thus, in step 406 and 408, timer T2 is started if timer T2 has not been started. After timer T2 is started (step 408) or if timer T2 has already started (yes branch of step 406), the method checks at step 410 to determine whether timer T2 has expired.

Figure 5:
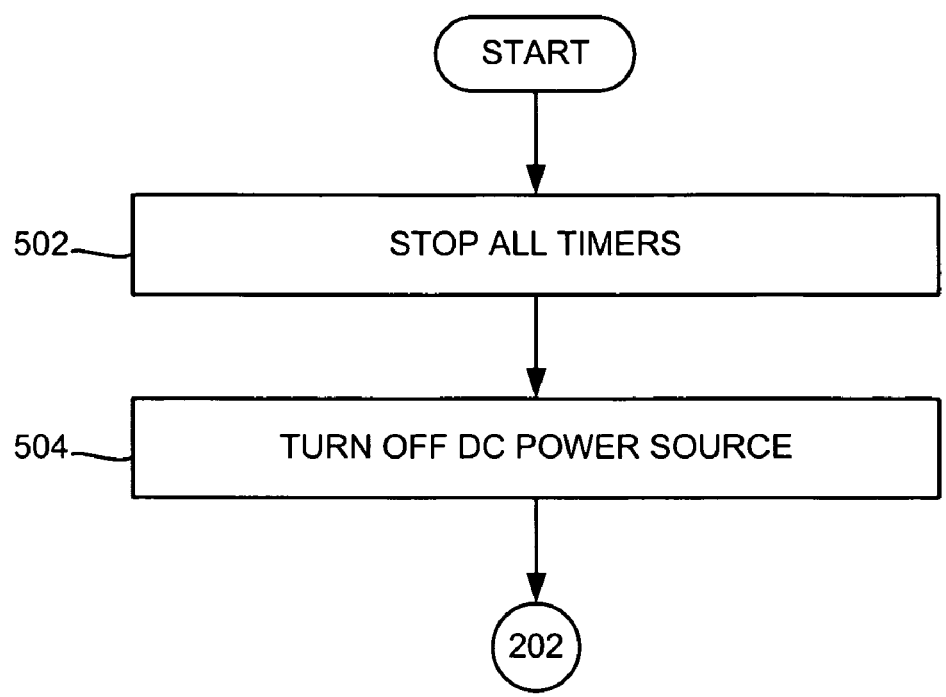
FIG. 5 shows a flow chart describing the steps/actions taken to shut down the power source, in accordance with an embodiment of the present invention.

If timer T2 has expired while the current through resistor R4 remains above the dangerous threshold "TIMED CURRENT THRESHOLD," (yes branch of step 410), the method proceeds to step 502 of FIG. 5 to turn off all timers (step 502 of FIG. 5) and to turn off the power supply 102 (step 504 of FIG. 5). Alternatively or additionally, the processor may also open switch 126. Thereafter, the method returns from step 504 of FIG. 5 to step 202 of FIG. 2 (representing the disconnected state).

As mentioned, one or more of steps 412, 414, 416, 418, and 420 implements the low voltage condition check for the voltage at sense node 144. The voltage at sense node 144 may become critically low if, for example, there exists a short between terminals 140 and 142 after connector 108 is plugged in and power is being delivered to terminal 140. In step 412, the voltage at sense node 144 is checked (by processor 104) to see whether that voltage drops below a critical voltage threshold VT1. In an embodiment, VT1 may be, for example, 0.5 V. If the voltage at sense node 144 falls below the critical voltage threshold VT1, the method proceeds step 502 of FIG. 5 (yes branch of step 412) to immediately turn off all timers (step 502 of FIG. 5) and to turn off the power supply 102 (step 504 of FIG. 5). Alternatively or additionally, the processor may also open switch 126. Thereafter, the method returns from step 504 of FIG. 5 to step 202 of FIG. 2 (representing the disconnected state).

At step 414 (from the no branch of step 412), it is ascertained whether the voltage at sense node 144 falls below a higher-than-critical but still potentially dangerously low voltage threshold TIMED VOLTAGE THRESHOLD. This situation may happen, for example, if a defect in power supply 102 causes power supply 102 to output a dangerously low voltage.

If the voltage at sense node 144 falls below the higher-than-critical but still potentially dangerously low voltage threshold TIMED VOLTAGE THRESHOLD, a timer is watched to determine if the voltage at sense node 144 stays below this threshold for longer than a predetermined time period (determined by timer voltage T3). This watch is performed by steps 416, 418, and 420. Thus in step 418, if timer T3 has not started (no branch of step 416), timer T3 is started. If timer T3 has started (yes branch of step 416), step 420 checks to see if voltage timer T3 has expired. If voltage timer T3 expired while the voltage at sense node 414 remains under the higher-than-critical but still potentially dangerously low voltage threshold TIMED VOLTAGE THRESHOLD, the method proceeds to step 502 of FIG. 5 (yes branch of step 420) to turn off all timers (step 502 of FIG. 5) and turn off the power supply 102 (step 504 of FIG. 5). Alternatively or additionally, the processor may also open switch 126. Thereafter, the method returns from step 504 of FIG. 5 to step 202 of FIG. 2 (representing the disconnected state).

Returning to step 414, if voltage at sense node 144 does not fall below the higher-than-critical but still potentially dangerously low voltage threshold TIMED VOLTAGE THRESHOLD, the PPC is operating normally and the method proceeds to step 602 of FIG. 5 to begin checking whether a low current condition exists across resistor R4. As mentioned, this low current condition may be indicative of either a "decoupling" scenario (e.g., the user disconnects the power adapter from the laptop computer) or a "low-power" scenario (e.g., the user turns off the laptop computer but leaving the power adaptor plugged in.

Figure 6:
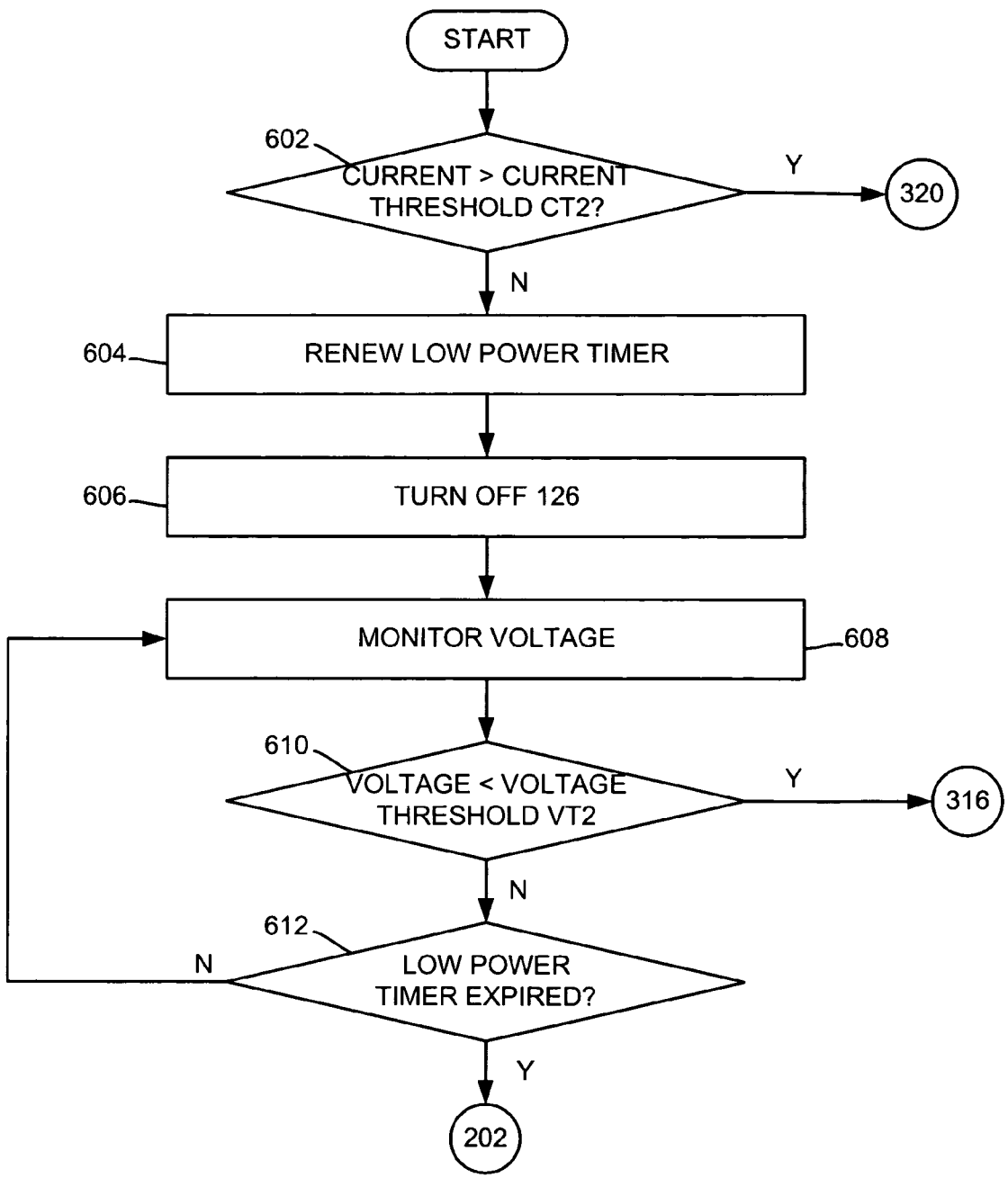
FIG. 6 shows a flow chart describing the steps/actions taken in testing for the low-power scenario or the decoupling scenario, in accordance with an embodiment of the present invention.

Thus, in step 602 of FIG. 6, the current through resistor R4 is monitored (by processor 104 via differential amplifier 106 and node 146) to ascertain whether this current drops below a current threshold CT2 (e.g., minimum current output by power supply for an operational laptop in an embodiment). If the current through resistor R4 stays above current threshold CT2, the system is deemed to operate normally in which case the method returns to step 320 of FIG. 3 (yes branch of step 602) to back to continue "on" status checks.

On the other hand, if the current through resistor R4 falls below the current threshold CT2 (no branch of step 602), the method proceeds to ascertain whether the low current condition through resistor R4 is indicative of a "decoupling" scenario or a "low-power" scenario. In step 604, a low power timer is started. In step 606, switch 126 is turned off. In steps 608-612, the method monitors the voltage level at sense node 144 (which steady-state level and/or rate of decay depends on whether the system impedance of the electronic device is still seen by terminals 140 and 142).

If the voltage at sense node 144 stays above a voltage threshold VT2 for longer than a time period determined by a low power timer, the "decoupling" scenario is deemed to have occurred. This voltage threshold VT2 for sense node 144 is selected to be the voltage threshold that discriminates between the case where the laptop is still connected to the power adapter but the laptop is turned off and the case where the laptop is disconnected from the power adapter. In the case where sense node 144 stays above a voltage threshold VT2 for longer than the low power period (no branch of step 610 and yes branch of step 612), the method proceeds to step 202 of FIG. 2 to start operating from the disconnected state again.

Returning to step 610, if the voltage at sense node is below the voltage threshold VT2 (yes branch of step 610), the method proceeds to step 316 of FIG. 3 to turn switch 126 back on (since switch 126 was turned off in step 606). In this case, the processor 104 has determined that the electronic device is turned off but still plugged in (i.e., its characteristic impedance is still seen by terminals 140 and 142 and still affecting the rate of decay at node 140 and sense node 144 after switch 126 is turned off). Turning the switch 126 back on in step 316 of FIG. 3 allows the PPC to begin the "on" status checks again (since switch 126 is closed even if a high operating current is not presently required by the dormant-but-plugged-in electronic device 150).

As can be appreciated from the foregoing, embodiments of the invention permit various operating conditions of the power supply to be accurately monitored and appropriate actions to be rapidly and appropriately taken with respect to different operating scenarios and operating states. Embodiments of the invention rely not only on contemporaneous measurements of electrical parameters to perform its power supply managing tasks (as would be the case with an analog controller) but also on present state information (i.e., the state the PPC is currently in before switching to the next state) and the voltage level/pattern information received at sense nodes 144 and 146 to more accurately and rapidly perform its tasks.

Advantageously, embodiments of the invention employ the power and ground conductors for its monitoring tasks. In this sense, it may be said that the voltage information that exist on analog sense node 144 and analog sense node 146 is obtained through (i.e., derivative of or deriving from) voltage and/or current at/on/through terminals 140 and 144 (which are the power conductor and the ground conductor that supply power voltage level and ground voltage level to the electronic device), thereby eliminating the need for a separate sense wire/conductor between the circuitry of the PPC and the circuitry of the electronic device and/or the circuitry of the power supply While this invention has been described in terms of several embodiments, there are alterations, permutations, and equivalents, which fall within the scope of this invention. It should also be noted that there are many alternative ways of implementing the methods and apparatuses of the present invention. For example, impedance circuit values and timer values as described herein are highly dependent on the power source specification and the specification of the electronic device, as well as design choices. The impedance circuits may be implemented by resistors or any other suitable impedance arrangements. The power supply may represent a power supply that transforms one voltage level to another or may simply representing a non-transforming (i.e., not translating from one voltage level to another voltage level) power supply. It is therefore intended that the following appended claims be interpreted as including all such alterations, permutations, and equivalents as fall within the true spirit and scope of the present invention.

What is claimed is:

1. A management circuit for a power supply, said power supply being configured to supply a first voltage level and a ground voltage level, comprising:
    a first management circuit terminal coupled to a positive supply terminal of said power supply, said positive supply terminal being configured to provide said first voltage level;
    a second management circuit terminal coupled to a ground terminal of said power supply, said ground terminal being configured to provide said ground voltage level;
    a switch;
    a processor coupled to said switch for controlling said switch;
    a first output terminal, said switch being coupled to said first management circuit terminal and said first output terminal for controllably providing said first voltage level to said first output terminal;
    a first impedance circuit coupled to said second management circuit terminal; and
    a second output terminal coupled to said first impedance circuit, wherein said processor controls said switch opening and said switch closing responsive to both parameters sensed through said first output terminal and said second output terminal and previous state information pertaining to a present operating state of said management circuit.

2. The management circuit of claim 1 further comprising a second impedance circuit coupled in parallel with said switch between said first management circuit terminal and said first output terminal, said second impedance circuit having an impedance value that is higher than an impedance value of said first impedance circuit.

3. The management circuit of claim 2 further comprising:
    a first analog sense node coupled to said processor;
    a third impedance circuit coupled between said first output terminal and said first analog sense node; and
    a fourth impedance circuit coupled between said second management circuit terminal and said first analog sense node.

4. The management circuit of claim 3 further comprising:
    a second analog sense node coupled to said processor;
    a differential amplifier for sensing a voltage difference across said first impedance circuit, said differential amplifier having a first differential amplifier input, a second differential amplifier input, and a differential amplifier output, said first differential amplifier input being coupled to a first terminal of said first impedance circuit, said second differential amplifier input being coupled to a second terminal of said first impedance circuit, said differential amplifier output being coupled to said processor.

5. The management circuit of claim 4 wherein said first impedance circuit, said second impedance circuit, said third impedance circuit, and said fourth impedance circuit are implemented by resistors.

6. The management circuit of claim 4 wherein said parameters represents voltages are sensed by said processor at said first analog sense node and at said second analog sense node.

7. The management circuit of claim 4 wherein said state information is kept by said processor.

8. The management circuit of claim 3 wherein said processor includes a differential amplifier for sensing a voltage difference across said first impedance circuit, said differential amplifier having a first differential amplifier input, and a second differential amplifier input, said first differential amplifier input being coupled to a first terminal of said first impedance circuit, said second differential amplifier input being coupled to a second terminal of said first impedance circuit.

9. The management circuit of claim 8 wherein said first impedance circuit, said second impedance circuit, said third impedance circuit, and said fourth impedance circuit are implemented by resistors.

10. The management circuit of claim 8 wherein said parameters represents voltages are sensed by said processor at said first analog sense node and at said second analog sense node.

11. The management circuit of claim 8 wherein said state information is kept by said processor.

12. A method for controlling a power supply, said power supply being configured to supply a first voltage level and a ground voltage level, comprising:
    providing a management circuit, said management circuit including:
        a first management circuit terminal coupled to a positive supply terminal of said power supply, said positive supply terminal being configured to provide said first voltage level,
        a second management circuit terminal coupled to a ground terminal of said power supply, said ground terminal being configured to provide said ground voltage level,
        a switch,
        a processor coupled to said switch for controlling said switch,
        a first output terminal, said switch being coupled to said first management circuit terminal and said first output terminal for controllably providing said first voltage level to said first output terminal,
        a first impedance circuit coupled to said second management circuit terminal,
        a second output terminal coupled to said first impedance circuit, a second impedance circuit coupled in parallel with said switch between said first management circuit terminal and said first output terminal, said second impedance circuit having an impedance value that is higher than an impedance value of said first impedance circuit, a first analog sense node coupled to said processor, a third impedance circuit coupled between said first output terminal and said first analog sense node, a fourth impedance circuit coupled between said second management circuit terminal and said first analog sense node, a second analog sense node coupled to said processor, and a differential amplifier for sensing a voltage difference across said first impedance circuit, said differential amplifier having a first differential amplifier input, a second differential amplifier input, and a differential amplifier output, said first differential amplifier input being coupled to a first terminal of said first impedance circuit, said second differential amplifier input being coupled to a second terminal of said first impedance circuit, said differential amplifier output being coupled to said processor; and monitoring at least one of said first analog sense node and said second analog sense node using said processor, wherein said processor controls said switch opening and said switch closing responsive to both parameter information sensed at said at least one of said first analog sense node and said second analog sense node and previous state information pertaining to a present operating state of said management circuit.

13. The method of claim 12 further comprising:
monitoring, using said processor, a first sense node voltage level at said first analog sense node while said management circuit is in a disconnected state, said disconnected state being characterized by said switch being open and said first output terminal and said second output terminal not being connected to an external electronic device; and if said first sense node voltage level remains in a good connection voltage range for a first predefined time period, entering a connected state that is characterized by said switch being closed, thereby completing a conduction path between said first management circuit terminal and said first output terminal through said switch, said good connection voltage range representing an expected range of voltages for said first analog sense node if said electronic device is coupled to said first output terminal and said second output terminal and if said power supply, said management circuit, and said electronic device operates normally.

14. The method of claim 13 further comprising:
if said first sense node voltage level drops out of said good connection voltage range at any time before a termination of said first predefined time period, resetting said a timer employed to track said first predefined time period and returning said management circuit to said disconnected state.

15. The method of claim 13 further comprising:
monitoring, using said processor, a second sense node voltage level at said second analog sense node while said management circuit is in said connected state;

if said second sense node voltage drops below a connection voltage threshold, opening said switch using said processor and ascertaining, using said processor, whether said management circuit is in a low-power state or a decoupling state, said electronic device remains coupled to said first output terminal and said second output terminal in said low-power state, said electronic device being disconnected from said first output terminal and said second output terminal in said decoupling state; and if said management circuit is determined by said processor to be in said decoupling state, leaving said switch open and returning to said disconnected state.

16. The method of claim 15 further comprising:
if said management circuit is determined by said processor to be in said low-power state, closing said switch using said processor and returning to said connected state.

17. The method of claim 16 wherein said disconnected state is entered if said second sense node voltage stays above said connection voltage for a second predefined time period.

18. The method of claim 13 further comprising:
monitoring, using said processor, said second sense node voltage level while said management circuit is in said connected state; and if said second sense node voltage level exceeds a critical threshold, immediately performing at least one of opening said switch and turning off said power supply.

19. The method of claim 18 further comprising:
monitoring, using said processor, said second sense node voltage level while said management circuit is in said connected state; and if said second sense node voltage level exceeds a dangerous threshold for a third predefined time period, said dangerous threshold being lower than said critical threshold, performing at least one of opening said switch and turning off said power supply.

20. The method of claim 13 further comprising:
monitoring, using said processor, said first sense node voltage level while said management circuit is in said connected state; and if said first sense node voltage level falls below a first threshold, immediately performing at least one of opening said switch and turning off said power supply.

21. The method of claim 20 further comprising:
monitoring, using said processor, said first sense node voltage level while said management circuit is in said connected state; and if said first sense node voltage level falls between a second threshold that is higher than said first threshold and said first threshold for a fourth predefined time period, performing at least one of opening said switch and turning off said power supply.

22. A method for controlling a power supply, said power supply being configured to supply a first voltage level and a ground voltage level, comprising:

providing a management circuit having a processor coupled to a switch, said switch being coupled between a first output terminal of said management circuit and a positive supply terminal of said power supply that provides said first voltage level, said processor controlling switch opening and switch closing of said switch to respectively break and make a conduction path between said first output terminal and said positive supply terminal;

providing a resistor coupled between a ground terminal of said power supply that supplies said ground voltage level and a second output terminal of said management circuit, whereby said first output terminal and said second output terminal representing respectively a power conductor and a ground conductor configured to provide said first voltage level and said ground voltage level respectively to an electronic device when said electronic device is coupled to said management circuit; and monitoring voltages obtained at at least one of said first analog sense node and said second analog sense node using said processor, wherein said voltages at said first sense node and said second sense nodes are derived from one of voltage and current obtained from said first output terminal and said second output terminal, said processor controlling said switch opening and said switch opening based at least on said voltages obtained at said at said at least one of said first analog sense node and said second analog sense node and previous state information pertaining to a present operating state of said management circuit.

23. The method of claim 22 further comprising:
monitoring, using said processor, a first sense node voltage level at said first analog sense node while said management circuit is in a disconnected state, said disconnected state being characterized by said switch being open and said first output terminal and said second output terminal not being connected to said electronic device; and
if said first sense node voltage level remains in a good connection voltage range for a first predefined time period, entering a connected state that is characterized by said switch being closed, thereby completing a conduction path between said positive supply terminal and said first output terminal through said switch, said good connection voltage range representing an expected range of voltages for said first analog sense node if said electronic device is coupled to said first output terminal and said second output terminal and if said power supply, said management circuit, and said electronic device operates normally.

24. The method of claim 23 further comprising:
if said first sense node voltage level drops out of said good connection voltage range at any time before a termination of said first predefined time period, resetting said a timer employed to track said first predefined time period and returning said management circuit to said disconnected state.

25. The method of claim 23 further comprising:
monitoring, using said processor, a second sense node voltage level at said second analog sense node while said management circuit is in said connected state;
if said second sense node voltage drops below a connection voltage threshold, opening said switch using said processor and ascertaining, using said processor, whether said management circuit is in a low-power state or a decoupling state, said electronic device remains coupled to said first output terminal and said second output terminal in said low-power state, said electronic device being disconnected from said first output terminal and said second output terminal in said decoupling state; and
if said management circuit is determined by said processor to be in said decoupling state, leaving said switch open and returning to said disconnected state.

26. The method of claim 25 further comprising:
if said management circuit is determined by said processor to be in said low-power state, closing said switch using said processor and returning to said connected state.

27. The method of claim 26 wherein said disconnected state is entered if said second sense node voltage stays above said connection voltage for a second predefined time period.

28. The method of claim 23 further comprising: monitoring, using said processor, said second sense node voltage level while said management circuit is in said connected state; and if said second sense node voltage level exceeds a critical threshold, immediately performing at least one of opening said switch and turning off said power supply.

29. The method of claim 28 further comprising:
monitoring, using said processor, said second sense node voltage level while said management circuit is in said connected state; and
if said second sense node voltage level exceeds a dangerous threshold for a third predefined time period, said dangerous threshold being lower than said critical threshold, performing at least one of opening said switch and turning off said power supply.

30. The method of claim 23 further comprising:
monitoring, using said processor, said first sense node voltage level while said management circuit is in said connected state; and
if said first sense node voltage level falls below a first threshold, immediately performing at least one of opening said switch and turning off said power supply.

31. The method of claim 30 further comprising:
monitoring, using said processor, said first sense node voltage level while said management circuit is in said connected state; and
if said first sense node voltage level falls between a second threshold that is higher than said first threshold and said first threshold for a fourth predefined time period, performing at least one of opening said switch and turning off said power supply.

* * * * *